United States Patent
Malzahn

(10) Patent No.: US 7,092,400 B2
(45) Date of Patent: Aug. 15, 2006

(54) METHOD OF TRANSMITTING DATA THROUGH A DATA BUS

(75) Inventor: Ralf Malzahn, Seevetal (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 886 days.

(21) Appl. No.: 10/104,913

(22) Filed: Mar. 22, 2002

(65) Prior Publication Data

US 2002/0146019 A1    Oct. 10, 2002

(30) Foreign Application Priority Data

Mar. 27, 2001   (DE)   ................. 101 15 118

(51) Int. Cl.
    *H04L 12/28*   (2006.01)
(52) U.S. Cl. ...................... 370/402; 711/105
(58) Field of Classification Search ............... 370/402, 370/404, 412, 413, 415, 417; 711/100, 101, 711/103, 105, 154, 170, 163, 220, 102, 104
See application file for complete search history.

U.S. PATENT DOCUMENTS

| | | | | |
|---|---|---|---|---|
| 5,745,420 A * | 4/1998 | McClure | ...................... | 365/201 |
| 5,765,184 A * | 6/1998 | Durante | ...................... | 711/103 |
| 6,141,727 A * | 10/2000 | Usami | ...................... | 711/105 |
| 6,145,069 A * | 11/2000 | Dye | ...................... | 711/170 |
| 6,578,132 B1 * | 6/2003 | Shimomura | ................. | 711/220 |

* cited by examiner

*Primary Examiner*—Phirin Sam

(57) ABSTRACT

The invention relates to a bus system for transmitting data between a processing unit (10) and a memory unit (19) comprising memory cells (17), in which a plurality of logic addresses is available for each memory cell (17). Dependent on the kind of address used, the data transmitted through the data bus (13) are differently manipulated by a data modification unit (16) so that, for protection against abuse of data, the unchanged identical data are not present at the data bus (13).

5 Claims, 1 Drawing Sheet

METHOD OF TRANSMITTING DATA THROUGH A DATA BUS

FIELD OF THE INVENTION

The invention relates to a method of transmitting data through a data bus between a processing unit and a memory unit comprising a plurality of memory cells, wherein the processing unit sends the logic addresses of a memory cell via an address bus, which logic addresses are to be accessed. The invention also relates to a data transmission system adapted to perform said method.

BACKGROUND OF THE INVENTION

For exchanging digital data between electronic data processing units, it is known to use bus systems. Bus systems connect one or more "central" processing units with, typically, a plurality of peripheral components or auxiliary units. The bus comprises the address bus with the address lines through which the units at the bus with which data are to be exchanged can be selected, as well as the data bus with the data lines which convey the binary data to be exchanged. Moreover, control lines of a control bus are usually provided, via which writing and reading of the data is coordinated. In most cases, the processing unit is constituted by a central processor (CPU) on one side of the bus system, while memories, input/output components or similar units are situated on the other side of the bus. Such units will hereinafter be uniformly denoted as "memory units", which memory units may comprise a plurality of individual "memory cells" for one data each.

In the known bus systems, there is a one-to-one relation between the memory cells that are addressable via the bus and the logic addresses via which these memory cells can be selected. For a write/read access to a given memory cell, the processing unit must therefore exactly apply the unambiguous logic address associated with the memory cell to the address bus, whereupon the connection with the desired memory cell is established and the data can be exchanged via the data bus. Thus, only one accurately defined address in the address location of the processing unit is obtained, by which the memory cell can be addressed. The data are transmitted in an unchanged form during the data exchange between the memory cell and the processing unit, i.e. they are transmitted in a "clear text" via the data bus.

The known method of exchanging data via a bus system has the drawback that it provides a weak point for unauthorized tapping of secret data. The reason is that the data to be transmitted are present as 1:1 copies on the data bus because each data is either directly controlled on the bus by the processing unit or processed in its present form by this unit. In the case of sensitive data such as, for example, a secret key for cryptographic functions, the problem arises that the secret data must be kept within comparatively large circuit portions. Moreover, algorithms often provide the sequence in which the data are to be written to individual addresses. This sequence must then be exactly maintained by the processing unit. Said characteristic features allow investigation of the confidential data by monitoring the bus system, the internal registers of the processing unit (CPU) or by other methods.

OBJECT AND SUMMARY OF THE INVENTION

To this end, an object of the present invention is to provide a method and a device which allow transmission of data between a processing unit and a memory unit via a data bus, providing a greater security as regards investigation attempts.

This object is solved by a method as defined in claim 1 and by a data transmission system as defined in claim 5. Advantageous embodiments are defined in the dependent claims.

The proposed method is used for transmitting data via a data bus which is situated between a processing unit and a memory unit comprising a plurality of memory cells. As stated hereinbefore, the term "memory unit" is to be understood to have a wide meaning and should also comprise input/output units which receive or prepare data under given addresses. In the method, the processing unit determines the logic address of a memory cell of the memory unit via an address bus, which logic address is to be accessed for reading or writing. The method is characterized in that at least two different logic addresses are assigned to at least one of the memory cells of the memory unit, preferably to all memory cells of the memory unit. The same memory cell can thus be addressed via at least two different addresses at the address bus. Moreover, the method is characterized in that the data are changed in dependence upon the logic address used for addressing the memory cell when they are transmitted between the memory cell and the data bus.

In the method described, the processing unit can therefore optionally access the same memory cell via different logic addresses. Dependent on the logic address used, the data read from the memory cell or to be written into the memory cell are then manipulated in different ways within the memory unit. The manipulation or change ensures that the data at the data bus are no longer identical to the data which are present in the memory cell or are processed by the processing unit. Consequently, there is no longer a 1:1 copy of these data at the data bus, which prevents a successful investigation of security-relevant or confidential data during the transmission.

The change of a data, which takes place during its transmission between a memory cell and the data bus, may mean, for example, that not all bits of the data are transmitted. This means that the data comprises only a smaller number of "useful bits" which convey the actual information. Other data which either transmit additional information or only serve for encrypting the relevant data content may then be impressed on unused data lines of the data bus.

Other possible changes of a data during its transmission between the memory cell and the data bus may be:
a) exclusive-OR combinations (XOR) with the address bits;
b) exclusive-OR combinations (XOR) with bits of the memory cell;
c) exclusive-OR combinations (XOR) with fixed values;
d) permutation of the data bits;
e) replacing individual data bits by individual address bits;
f) replacing individual data bits by fixed values;
g) use of cryptographic methods for the data bits in dependence upon the address bits, preferably with symmetrical algorithms such as DES or cipher block chaining (CBC).

In addition to the range of possibilities, there are numerous further possibilities of encrypting the data for their transmission via the data bus. It is only important in this respect that the change of the relevant bits of the data can be unambiguously restored again by the processing unit so that no information is lost.

In accordance with a further embodiment of the method, the kind of dependence between the logic address of a memory cell and the change of data is changed after every access to the memory unit and/or the memory cell. This can be controlled by a random number generator, while it should be ensured that the same random number generator is used in the memory unit and the processing unit in order that it can be unambiguously ascertained at both ends of the bus which type of data encryption is being used.

The invention also relates to a data transmission system comprising a processing unit and a memory unit with memory cells, wherein the processing unit and the memory unit are coupled together via an address bus and a data bus. As stated hereinbefore, the expression "memory unit" is to be understood to have a wide meaning and comprises all systems which receive or prepare data under given addresses. The data transmission system is characterized in that the memory unit comprises at least a data modification unit coupled to the address bus and to at least one memory cell and the data bus, which data modification unit changes the data during their transmission between the memory cell and the data bus in dependence upon the logic address of the memory cell present at the address bus, while at least one of the memory cells comprises at least two different logic addresses.

A method of the type described above may be performed with such a data transmission system. The data transmission system is preferably formed in such a way that it can also perform the variants of the method described hereinbefore. Such a data transmission system provides great security as regards investigation of confidential data, because identical copies of the relevant data are not present at the data bus but only changed data, which changes cannot be restored externally without knowing the algorithm used for these changes.

BRIEF DESCRIPTION OF THE DRAWINGS

The invention will hereinafter be elucidated by way of example with reference to the FIGURE. The sole FIGURE shows diagrammatically the components of a data transmission system according to the invention, and their coupling by means of various buses.

Figure 1:
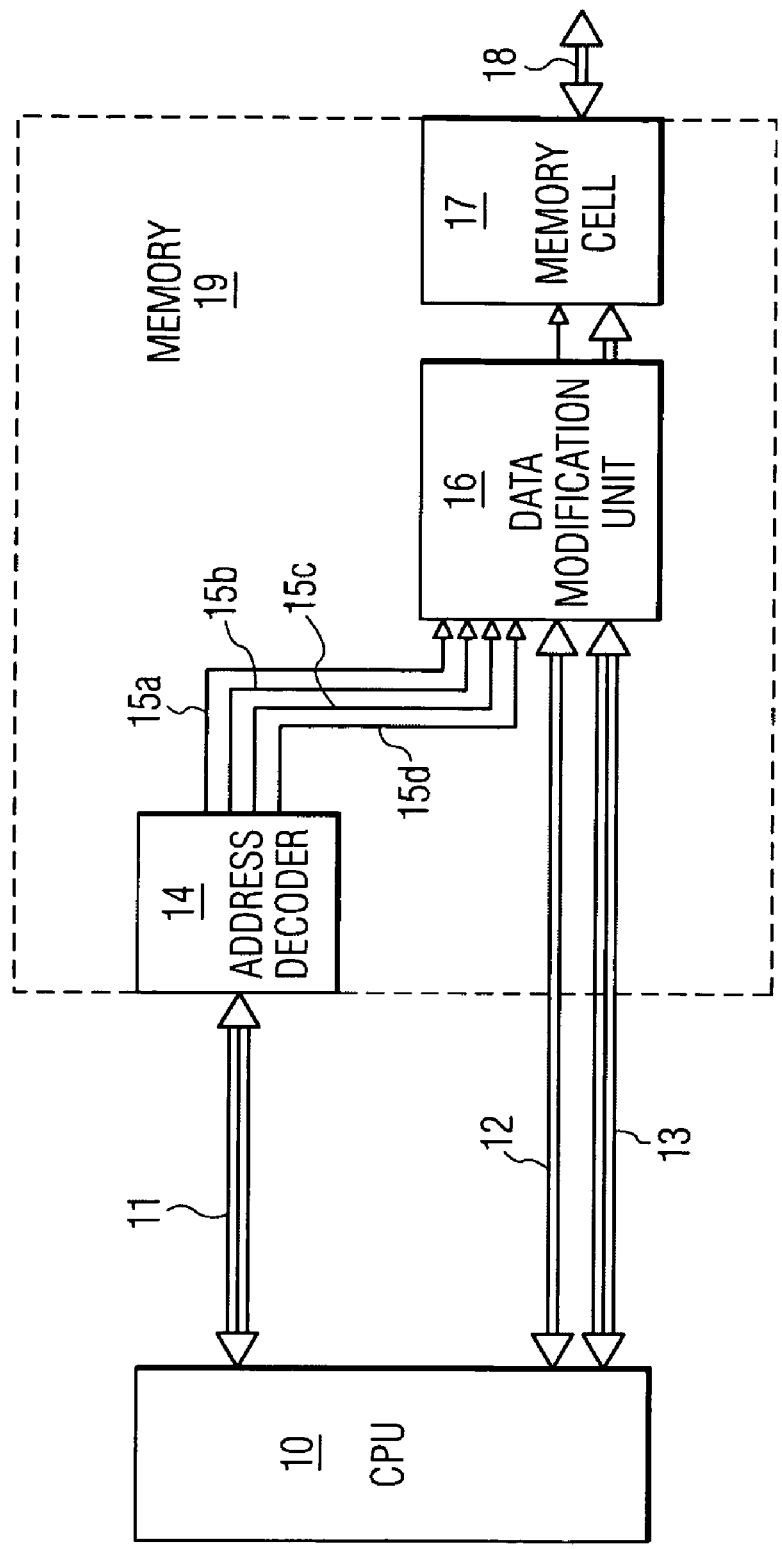

DESCRIPTION OF PREFERRED
EMBODIMENTS

The main components of the data transmission system are the processing unit 10, which in this case is a CPU, and the memory unit 19 with memory cells 17. The memory cell 17 may be a memory location in a RAM, a ROM, an EEPROM, an input/output register or the like. In the case of a register, the memory cell 17 is connected to other circuit portions via a line 18, which circuit portions use or change the contents of the register.

The processing unit 10 and the memory unit 19 are coupled via a bus system which comprises the address bus 11, the data bus 13 and the control bus 12. The processing unit 10 can apply, to the address bus 11, the logic addresses of those memory cells 17 into which data are to be written or from which data are to be read.

The current address at the address bus is decoded by an address decoder 14 in the memory unit 19. In the state of the art, exactly one logic address is assigned to the memory cell 17, under which address it can be addressed. This is different in the system according to the invention. In this system, the memory cell 17 can be addressed via several address selection signals 15*a*, 15*b*, 15*c*, 15*d* ("alias addresses"). In further contrast to the state of the art, the memory unit 19 comprises a combination logic or data modification unit 16 which is connected to the address decoder 14, the control bus 12 and the data bus 13, and to the memory cell 17.

The data modification unit 16 establishes a connection between the addressed memory cell 17 and the data bus 13, and does not pass the data which may be reversibly transmitted from the data bus 13 to the memory cell 17 simply as unchanged identical copies. The data modification unit 16 rather performs manipulations on the data, with the kind of manipulation being dependent on the logic address or on the selection signal 15*a–d* at which the memory cell 17 is addressed. The following modifications of the data can then be particularly implemented:

1. Dependent on the logic address at the address bus, only a few bits of the memory cell 17 are written/read. This means that, in addition to the actual useful bits, further data can be transmitted on the unused other lines of the data bus 13.
2. Dependent on the logic address at the address bus 11, the data are manipulated on their way between the data bus 13 and the memory cell 17. This means that, during writing, different data than those at the data bus 13 arrive at the memory cell 17, and, conversely, during reading. Possible manipulations are, for example
   a) exclusive-OR combinations (XOR) with the address bits;
   b) exclusive-OR combinations (XOR) with bits of the memory cell;
   c) exclusive-OR combinations (XOR) with fixed values;
   d) permutation of the data bits;
   e) replacing individual data bits by individual address bits;
   f) replacing individual data bits by fixed values;
   g) use of cryptographic methods for the data bits in dependence upon the address bits, preferably with symmetrical algorithms such as DES or cipher block chaining (CBC).

A multitude of possibilities is thus obtained for writing or reading a desired value into or from the memory cell with the addresses 15*a–d* while using different data. These possibilities may additionally be varied upon every time-sequential access, which variation may be controlled, for example, by a random number generator.

By utilizing the bus system, shown in the FIGURE, in systems processing secret data, it can be achieved that the CPU 10 does not need to operate with the secret data themselves during communication with memories or input/output components but addresses them only via the encryption measures described above. In spite of a fixed predetermined sequence of the target addresses, it is possible to vary the actual sequence of access to the target addresses due to the redundant logic addresses. All attacks targeted on the investigation of secret data are thereby made considerably more difficult. These attacks may comprise, for example, the monitoring of the bus system, monitoring of the internal registers of the CPU 10 or also attempts to draw conclusions, based on the system's current consumption, from the processed data (DPA).

Reference Signs:
10 processing unit (CPU)
11 address bus
12 control bus
13 data bus
14 address decoder
15*a–d* address selection signals
16 data modification unit
17 memory cell
18 line
19 memory unit

The invention claimed is:

1. A method of transmitting data through a data bus (13) between a processing unit (10) and a memory unit (19) comprising a plurality of memory cells (17), the processing unit sending the logic addresses of a memory cell (17) via an address bus (11), which logic addresses are to be accessed, characterized in that at least two different logic addresses are assigned to the memory cell (17) and in that the data are changed in dependence upon the logic address used for the memory cell during their transmission between the memory cell and the data bus (13).

2. A method as claimed in claim 1, characterized in that the change of a data consists in that not all of its bits are transmitted.

3. A method as claimed in claim 1, characterized in that a data is changed by
   a) exclusive-OR combinations (XOR) with the address bits;
   b) exclusive-OR combinations (XOR) with bits of the memory cell;
   c) exclusive-OR combinations (XOR) with fixed values;
   d) permutation of the data bits;
   e) replacing individual data bits by individual address bits;
   f) replacing individual data bits by fixed values;
   g) use of cryptographic methods for the data bits in dependence upon the address bits, preferably with symmetrical algorithms such as DES or cipher block chaining (CBC).

4. A method as claimed in claim 1, characterized in that the kind of dependence between the logic address of a memory cell (17) and the change of data is changed after every access to the memory unit (19) and/or the memory cell (17).

5. A data transmission system comprising a processing unit (10) and a memory unit (19) with memory cells (17), which processing unit and memory unit are coupled together via an address bus (11) and a data bus (13), characterized in that the memory unit comprises at least a data modification unit (16) coupled to the address bus and to at least one memory cell (17) and the data bus, which data modification unit changes the data during their transmission between the memory cell (17) and the data bus in dependence upon the logic address of the memory cell present at the address bus, while at least one of the memory cells comprises at least two different logic addresses.

* * * * *